United States Patent [19]

Jones

[11] Patent Number: 4,968,058
[45] Date of Patent: Nov. 6, 1990

[54] STEERING COLUMN ARRANGEMENT IN A MOTOR VEHICLE

[75] Inventor: B. Jones, Borcham, Great Britain

[73] Assignee: Ford Motor Company, Dearborn, Mich.

[21] Appl. No.: 340,728
[22] PCT Filed: Jan. 20, 1988
[86] PCT No.: PCT/GB88/00037
    § 371 Date: Apr. 3, 1989
    § 102(e) Date: Apr. 3, 1989
[87] PCT Pub. No.: WO88/05741
    PCT Pub. Date: Aug. 11, 1988

[30] Foreign Application Priority Data

Jan. 31, 1987 [GB] United Kingdom ............... 8702188

[51] Int. Cl.⁵ .............................................. B62D 1/18
[52] U.S. Cl. ...................................... 280/777; 74/492
[58] Field of Search ................. 280/777, 779, 780; 180/282, 274; 74/492

[56] References Cited

U.S. PATENT DOCUMENTS

| 2,929,263 | 3/1960 | Felts | 280/777 |
| 3,464,284 | 9/1969 | Fergle | 180/282 |
| 3,811,337 | 5/1974 | Allison | 74/492 |
| 4,102,217 | 7/1978 | Yamamoto et al. | 74/492 |
| 4,337,967 | 7/1982 | Yoshida | 280/777 |

FOREIGN PATENT DOCUMENTS

| 2408174 | 9/1974 | Fed. Rep. of Germany | 280/777 |
| 3544345 | 7/1986 | Fed. Rep. of Germany | . |
| 3337231 | 1/1987 | Fed. Rep. of Germany | . |
| 1163861 | 9/1969 | United Kingdom | . |
| 1485001 | 9/1977 | United Kingdom | . |

Primary Examiner—Charles A. Marmor
Assistant Examiner—Karin Tyson
Attorney, Agent, or Firm—Jerome R. Drouillard; Roger L. May

[57] ABSTRACT

A steering column is arranged so that it is rapidly pulled forward, away from the driver in the event of a crash to avoid the driver injuring himself on the wheel. An actuator (26) having an explosive charge is mounted between the column (10) and its supporting bracket (14) and the actuator is triggered when an impact occurs to drive the column (10) away from the driver. A spring loaded arm (38) prevents return movement of the column (10) after operation of the actuator (26).

6 Claims, 4 Drawing Sheets

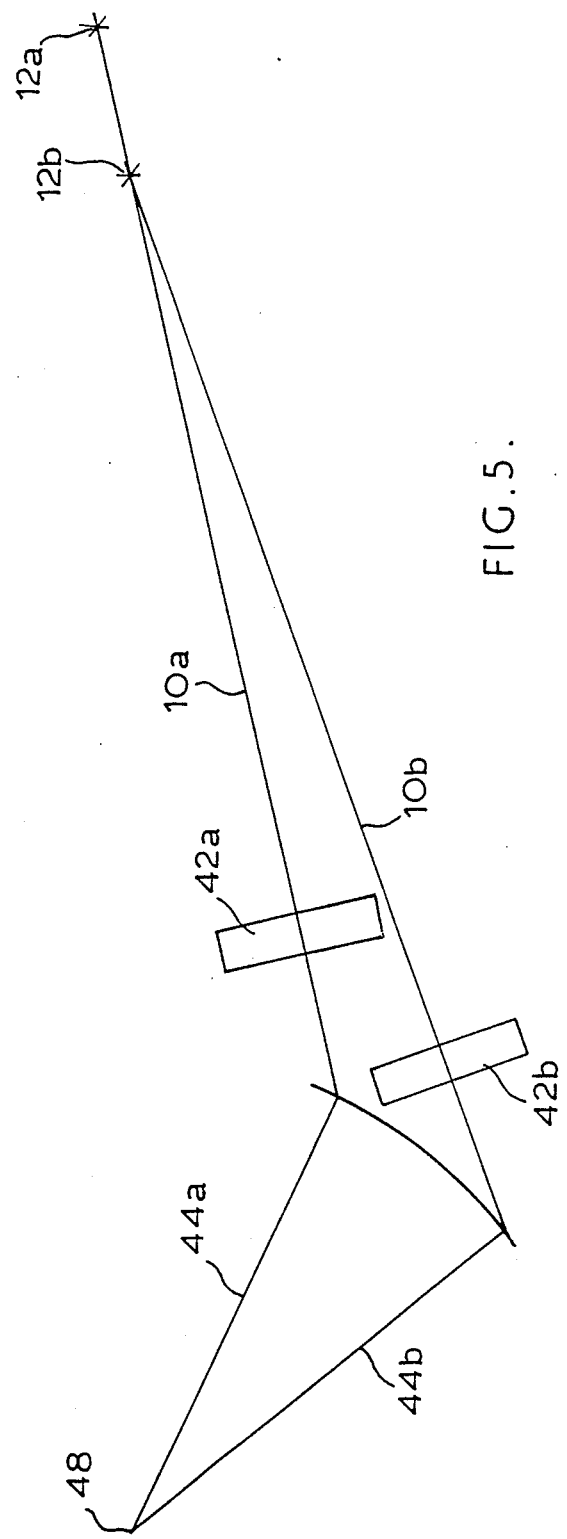

STEERING COLUMN ARRANGEMENT IN A MOTOR VEHICLE

This invention relates to a steering column arrangement in a motor vehicle where the steering column is moved away from the driver in the event of a front-end impact.

In a front-end impact, the vehicle experiences a sudden deceleration and the driver is driven forward and collides with the steering wheel. This impact can cause chest and other injuries.

In order to avoid such injuries various proposals have been put forward. One such proposal is to package a so-called air bag on the steering wheel and to automatically trigger the rapid inflation of this bag when an impact occurs. Another proposal makes use of the relative movement which will normally occur in such a crash between the engine block and the rest of the bodywork to pull the steering column away from the driver, by means of a system of cables.

According to the present invention, there is provided a steering column arrangement in a motor vehicle, the arrangement comprising a steering column supported by brackets in the vehicle, an actuator positioned between the column and the brackets and including an explosive charge arranged so that when the actuator is triggered, the charge explodes and drives the steering column away from the position in the vehicle where the driver is located, and a sensor adapted to sense a front-end impact on the vehicle of above a predetermined magnitude, and to trigger the actuator when such an impact is sensed.

The actuator is preferably supported on the column and the part of the actuator which is moved by the explosive charge bears against a column-supporting bracket.

The column is preferably held against movement (prior to triggering off the actuator) by shear pins which connect the column to at least one of its supporting brackets. The shear pins are then broken when the actuator is triggered.

The column may include a conventional corrugated sleeve or other energy absorbing formation which can be effective on its own, in respect of impacts below the predetermined magnitude, and in conjunction with the actuator in respect of impacts above the predetermined magnitude.

The arrangement may include a non-return mechanism which will keep the column in its position away from the driver after it has been moved to this position by the actuator. The non-return mechanism may comprise a hinged and spring-loaded arm mounted on the column arranged such that the arm is normally kept in an inactive position, with the biasing spring compressed, in the normal position of the column but is released and takes up an active, blocking position once the column has been moved by the actuator.

In order to allow the steering column to be moved away from the driver it is necessary to shorten the distance from the steering wheel itself to the Point where the column connects with a steering mechanism. To enable this to happen, the brackets supporting the column allow the column to move laterally as well as longitudinally so that the angle which the column makes to the center line of the vehicle alters as the column is driven by the actuator. In this specification, components which are described as being mounted on the column may alternatively be mounted on the brackets or the adjacent fixed parts of the vehicle bodywork, and parts which are described as being mounted on the brackets or bodywork may alternatively be mounted on the column.

The invention will now be further described, by way of example, with reference to the accompanying drawings, in which:

FIG. 5 is a schematic plan view showing the orientation of the steering column both before and after triggering of the actuator.

FIG. 1 shows a steering column 10 with the position of the steering wheel shown at 12. Details of connections between the column and the steering wheel itself are not shown.

Figure 1:
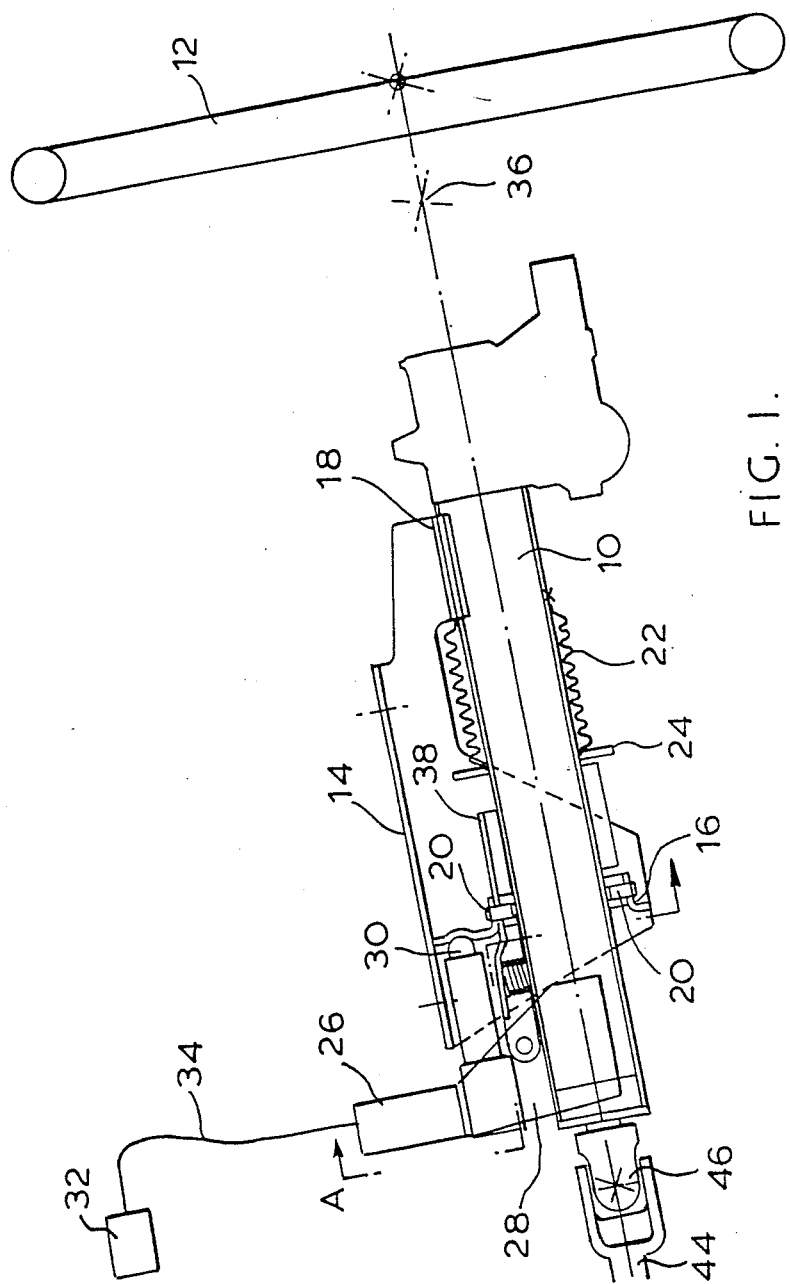
FIG. 1 is a side view of a steering column arrangement in accordance with the invention.

A support bracket 14 is attached to the fixed vehicle bodywork and supports the column, at the lower end by means of an annular flange 16 and at the upper end by means of a plate attachment region 18. In its normal condition, the column 10 is held against axial movement by shear pins 20 which engage the column and the flange 16.

A corrugated sleeve 22 surrounds the column 10 and acts in the conventional way in absorbing energy. At its lower end, an annular plate 24 is attached to the sleeve 22, and this plate 24 abuts against a fixed surface around the column so that the rest of the sleeve can crumple up behind it and absorb energy.

A pyrotechnic actuator 26 is mounted on the column 10 by means of mounting plates 28. The actuator has a plunger 30 which acts against the flange 16. The actuator 26 contains an explosive charge which, when triggered, causes the plunger 30 to be rapidly and forcefully extended. Actuators of this type are known in themselves and will not be described in more detail here. The actuator is connected to a sensor 32 which will be mounted at a suitable place on the vehicle in order to detect the occurrence of a front-end impact above a certain magnitude. Clearly the actuator should not be triggered in the event of minor impacts where there is no risk of substantial injury to the driver of the car. When a large impact is detected, the sensor passes a signal along the line 34 to trigger the actuator 26.

Figure 2:
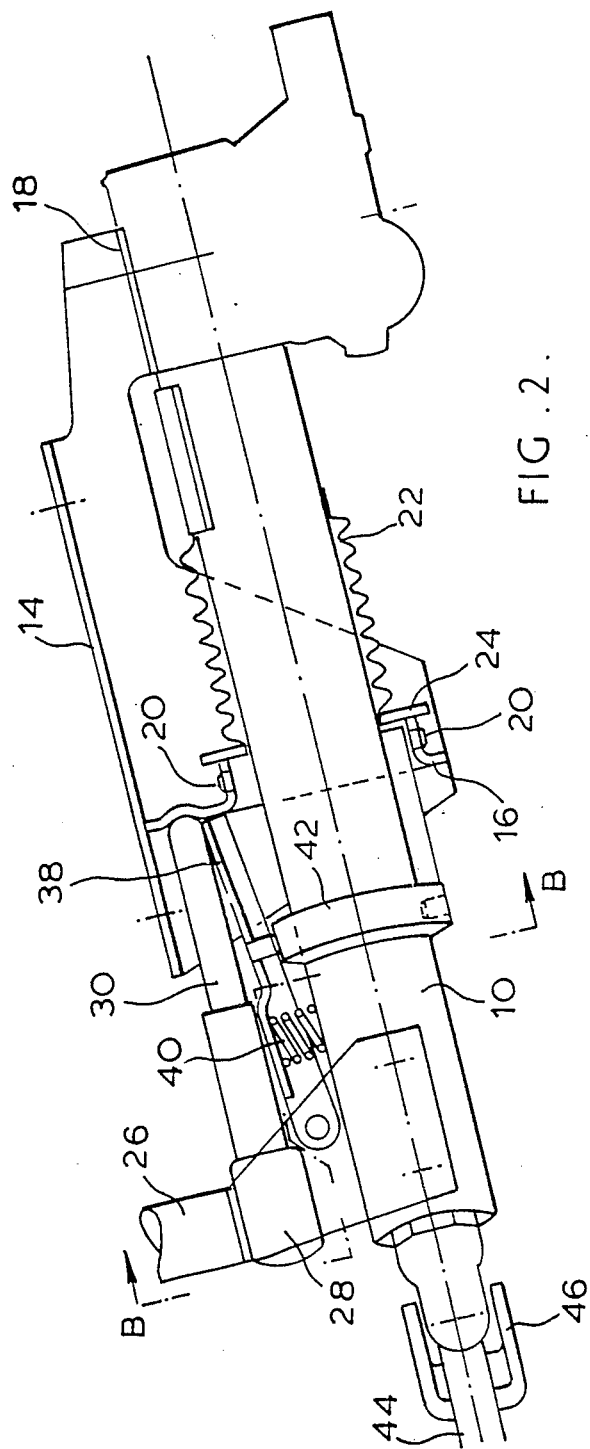
FIG. 2 shows the steering column of FIG. 1 in its position after triggering of the actuator.

FIG. 2 shows the position once the actuator has been triggered, and this FIGURE is on a larger scale than FIG. 1. It will be seen that the plunger 30 is in its extended position and as a result the column 10 has been displaced to the left relative to the bracket 14, when compared with the position shown in FIG. 1. The shear pins 20 have been sheared and the annular plate 24 on the corrugated sleeve 22 is in contact with the flange 16. When this has occurred the front of the steering wheel 12 will move to the position indicated at 36 in FIG. 1. At this point, the corrugated sleeve 22 is not collapsed at all but it can do so if a further impact is applied to the steering wheel itself.

Once the shear pins 20 have been sheared, and the actuator has been triggered there may be no support for the column to prevent it moving freely axially. In order to prevent the column returning to its original position therefore, a spring loaded arm 38 is hinged on the bracket 28 and is under the influence of a compression spring 40. In the normal position shown in FIG. 1, the arm 38 is held flat against the column 10 because it passes through a slot in the flange 16 (and supports one of the shear pins 20). However when the position of FIG. 2 has been reached, the free end of the arm 38 is no longer restrained radially by the flange 16 and the spring 40 lifts the arm up so that it jams behind the flange 16 and prevents reverse movement of the column.

The shear pins 20 (conveniently there can be two of these spaced 180° apart) are supported in a ring 42.

In order to accommodate the reduction in the distance between the steering wheel 12 and the point where the steering column meets the steering gear, it is necessary to allow for an alteration in the column geometry. FIG. 5 shows, in plan view, the line of action of the steering column indicated by 10a in its normal position, together with the line of action of a connecting link 44a. The column 10 and the link 44 are connected by a universal joint 46 (see FIGS. 1 and 2). The position of the shear pin carrying ring 42 is also indicated at 42a in FIG. 5.

Figure 3:
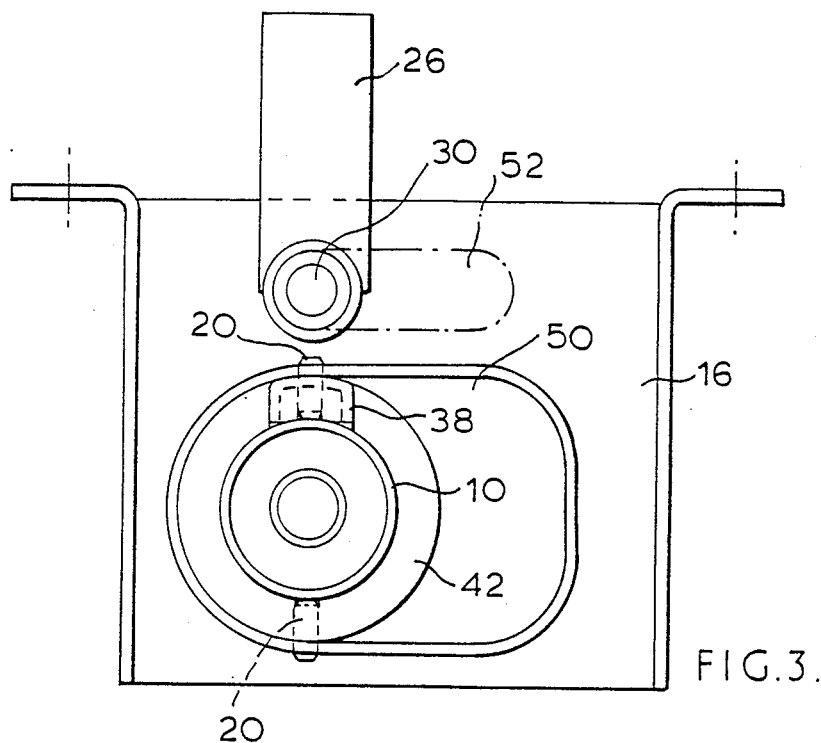
FIG. 3 is a section on the lines A—A from FIG. 1.
Figure 4:
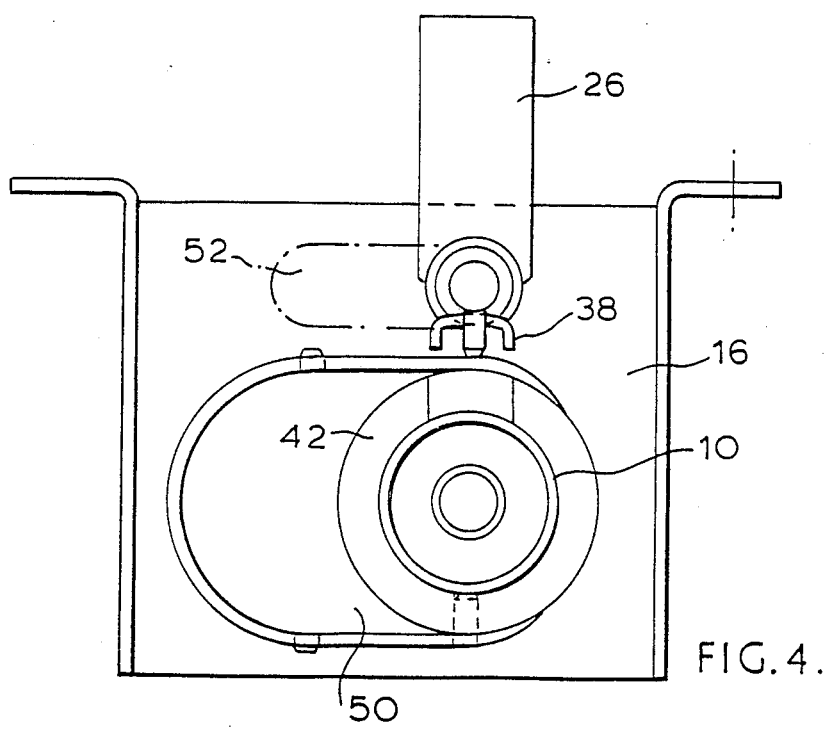
FIG. 4 is a section on the line B—B from FIG. 2.

When the actuator is triggered, the steering wheel 12 is moved from its initial position 12a to an axially forward position 12b, but the point of action of the steering column on a steering gear (this point is indicated at 48) will not necessarily change. In order to accommodate the movement of the steering wheel from 12a to 12b, it is therefore necessary to change the geometry such that the column takes up the position 10b, the link takes up the position 44b and the ring 42 moves to the position 42b. To accommodate this movement, the flange bracket 16 is constructed as shown in FIGS. 3 and 4 with an oval aperture 50 for the column. FIG. 3 shows the components in their normal Position, before triggering of the actuator 26. The plunger 30 bears against a depression 52 which is also oval in form. The shear pins 20 are supported in the ring 42 and pass through holes in the flange 16.

When the actuator is triggered, the shear pins 20 shear, and this can be clearly seen from FIG. 4. Note that the upper shear pin is accommodated partly in the spring loaded arm 38. In addition to the axial component of the movement as has already been illustrated with reference to FIGS. 1 and 2, there is also a lateral component of the movement in that the column 10 moves from one side to the other of the oval aperture 50 and takes with it the actuator 26 such that the plunger 30 thereby bears against the other end of the depression 52. The two positions 42a and 42b of the ring 42 are thus represented by FIGS. 3 and 4 respectively. FIG. 4 also shows the raised position of the arm 38, corresponding to that shown in FIG. 2.

In this way, the invention provides a rapid and effective mechanism for distancing the steering wheel from the driver to prevent injury to the driver. Installation is relatively simple as only a few component parts need to be modified when compared with a conventional (non-retracting) steering column and the actuator 26 and sensor 32 are components which, if not readily available, can easily be developed from readily available technology.

I claim:

1. A steering column arrangement in a motor vehicle, the arrangement comprising a steering column supported by brackets in the vehicle, an actuator spaced radially outwardly of said column, said actuator including a cylindrical plunger operatively associated therewith and an explosive charge arranged so that when said actuator is triggered, said charge explodes and drives said plunger so as to drive the steering column away from the position in the vehicle where the driver is located, and a sensor adapted to sense a front-end impact on the vehicle of above a predetermined magnitude and to trigger said actuator when such an impact is sensed, said arrangement further including a non-return mechanism to keep said column in its position away from the driver after said column has been moved by said actuator, said non-return mechanism comprising a hinged and spring-loaded arm mounted on said column arranged such that said arm is normally kept in an inactive position with the biasing spring compressed, said arm being released and taking up an active, blocking position once said column has been moved by said actuator.

2. An arrangement as in claim 1, wherein the actuator is supported on the column and said plunger bears against a column-supporting bracket.

3. An arrangement as claimed in claim 1, wherein the column is held against movement (prior to triggering off the actuator) by shear pins which connect the column to at least one of its supporting brackets.

4. An arrangement as claimed in claim 1, wherein the column includes a conventional energy absorbing device which can be effective on its own, in respect of impacts below the predetermined magnitude, and in conjunction with the actuator in respect of impacts above the predetermined magnitude.

5. An arrangement as claimed in claim 1, wherein the brackets supporting the column allow the column to move laterally as well as longitudinally so that the angle which the column makes to the center line of the vehicle alters as the column is driven by the actuator.

6. A steering column arrangement in a motor vehicle, the arrangement comprising:
a steering column supported by a column-supporting bracket in the vehicle and wherein said bracket is operative to allow said column to move laterally as well as longitudinally so that the angle which said column makes to the centerline of the vehicle alters as said column is driven;
an actuator spaced radially outwardly of said column, said actuator including a plunger operatively associated therewith and an explosive charge arranged so that when said actuator is triggered, said charge explodes said drives said plunger into said column supporting bracket so as to drive the steering column away from the position in the vehicle where the driver is located; and
a sensor adapted to sense a front-end impact on the vehicle of above a predetermined magnitude and to trigger said actuator when such an impact is sensed.

* * * * *